United States Patent
Ramrattan et al.

(10) Patent No.: US 8,792,683 B2
(45) Date of Patent: Jul. 29, 2014

(54) FINGERPRINT SCANNING WITH OPTICAL NAVIGATION

(75) Inventors: Colin Shiva Ramrattan, Waterloo (CA); Hassan Hosseinpor, Waterloo (CA); Graham Charles Townsend, Waterloo (CA); Robert James Lowles, Waterloo (CA); Rayhan Behin, Ottawa (CA); Gregory William Jacobs, Kitchener (CA)

(73) Assignee: BlackBerry Limited, Waterloo (CA)

( * ) Notice: Subject to any disclaimer, the term of this patent is extended or adjusted under 35 U.S.C. 154(b) by 563 days.

(21) Appl. No.: 12/793,960

(22) Filed: Jun. 4, 2010

(65) Prior Publication Data
US 2011/0300830 A1 Dec. 8, 2011

(51) Int. Cl.
*G06K 9/00* (2006.01)
*H04L 29/06* (2006.01)

(52) U.S. Cl.
CPC ................................. *H04L 63/0861* (2013.01)
USPC ............................ 382/115; 382/116; 382/124

(58) Field of Classification Search
CPC ......... H04N 7/18; H04N 9/3173; H04N 5/33; H04N 13/0242; H04N 13/0296; H04N 17/002; H04N 17/004; H04N 2005/2255; H04N 21/4126; H04N 21/42209; H04N 21/42224; H04N 21/4334; H04N 21/44227; H04N 21/47; G02B 2027/014; G02B 27/01; G02B 2027/0187; G02B 2027/0138; G02B 27/0093; G02B 27/017; G02B 2027/0118; G02B 2027/0123; G02B 13/003; G02B 13/0085; G02B 2027/0116; G02B 2027/0156; G02B 21/06
USPC .................. 382/107, 115, 116, 120, 124, 125
See application file for complete search history.

(56) References Cited

U.S. PATENT DOCUMENTS

| | | | | |
|---|---|---|---|---|
| 7,852,317 | B2* | 12/2010 | Grunnet-Jepsen et al. | ... 345/158 |
| 2002/0067408 | A1* | 6/2002 | Adair et al. | ...................... 348/76 |
| 2005/0156882 | A1* | 7/2005 | Manchester | .................. 345/158 |
| 2006/0152488 | A1* | 7/2006 | Salsman et al. | ............... 345/158 |
| 2009/0160769 | A1* | 6/2009 | Lowles et al. | .................. 345/160 |

FOREIGN PATENT DOCUMENTS

| | | |
|---|---|---|
| EP | 0905646 | 3/1999 |
| EP | 1645989 | 4/2006 |
| WO | 01/59558 | 8/2001 |

OTHER PUBLICATIONS

Extended European Search Report dated Nov. 24, 2010.
Qi Su et al.: A fingerprint authentication system based on mobile phone, 2005, XP002608966.
Maltoni D. et al.: "2.5 Touch versus Sweep" Oct. 7, 2003, XP002567649.

* cited by examiner

*Primary Examiner* — Brian Le
(74) *Attorney, Agent, or Firm* — Ridout & Maybee LLP (57) ABSTRACT

An optical navigation subsystem may be used when obtaining a candidate fingerprint for a mobile communication device (e.g., for authentication purposes). To accommodate such use of the optical navigation subsystem, the optical navigation subsystem may be adapted to automatically adjust a processed image sensor window from a first set of window dimensions (e.g., suitable for optical navigation) to a second set of window dimensions (e.g., suitable for fingerprint capture). Alternatively, a single, static set of window dimension may be employed in conjunction with stitching algorithms, or other methods suitable for forming candidate fingerprint images by combining a plurality of images obtained using the static set of window dimension.

14 Claims, 9 Drawing Sheets

FINGERPRINT SCANNING WITH OPTICAL NAVIGATION

FIELD

The present application relates generally to authentication for a computing device and, more specifically, to combining fingerprint scanning with optical navigation.

BACKGROUND

As mobile telephones have received increasing amounts of computing power in successive generations, the mobile telephones have been termed "smart phones". Along with increasing amounts of computing power, such smart phones have seen increases in storage capacity and, consequently, increased utility. Beyond telephone functions, smart phones may now send and receive digital messages, be they formatted to use e-mail standards, Short Messaging Service (SMS) standards, Instant Messaging standards and proprietary messaging systems. Smart phones may also store, read, edit and create documents, spreadsheets and presentations. Accordingly, there have been increasing demands for smart phones with enhanced authentication functions.

BRIEF DESCRIPTION OF THE DRAWINGS

Reference will now be made, by way of example, to the accompanying drawings which show example implementations; and in which.

DETAILED DESCRIPTION

An optical navigation subsystem may be used when obtaining a candidate fingerprint for a mobile communication device (e.g., for authentication purposes). To accommodate such use of the optical navigation subsystem, the optical navigation subsystem may be adapted to automatically adjust a processed image sensor window from a first set of window dimensions (e.g., suitable for optical navigation) to a second set of window dimensions (e.g., suitable for fingerprint capture). Alternatively, a single, static set of window dimension may be employed in conjunction with stitching algorithms, or other methods suitable for forming candidate fingerprint images by combining a plurality of images obtained using the static set of window dimension.

According to an aspect of the present disclosure, there is provided method of handling images. The method comprises receiving a digital image of a finger from an image sensor, transmitting the digital image, processing the digital image in a context of a plurality of previously received digital images to determine a finger motion indication and transmitting the finger motion indication. In other aspects of the present application, a biometric and optical navigation subsystem is provided for carrying out this method and a computer readable medium is provided for adapting a processor in a biometric and optical navigation subsystem to carry out this method.

Other aspects and features of the present disclosure will become apparent to those of ordinary skill in the art upon review of the following description of specific implementations of the disclosure in conjunction with the accompanying figures.

Figure 1:
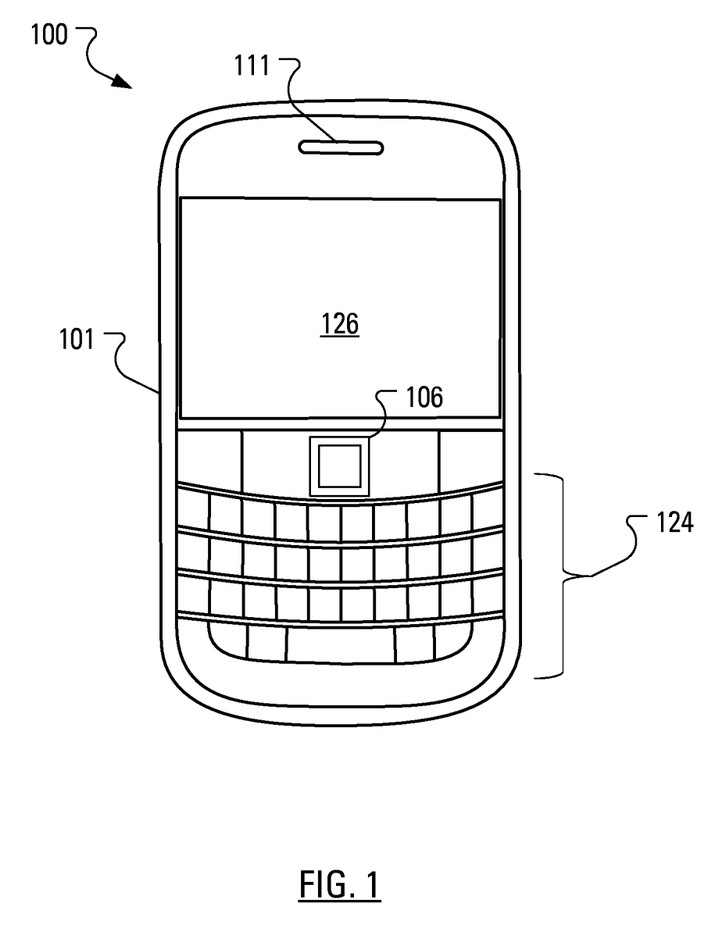
FIG. 1 illustrates an anterior side of a mobile communication device.

FIG. 1 illustrates an anterior side of a mobile communication device 100. Many features of the anterior side of the mobile communication device 100 are mounted within a housing 101 and include a display 126, a keyboard 124 having a plurality of keys, a speaker 111 and a navigation lens 106.

The mobile communication device 100 includes an input device (e.g., the keyboard 124) and an output device (e.g., the display 126), which may comprise a full graphic, or full color, Liquid Crystal Display (LCD). In some implementations, the display 126 may comprise a touchscreen display. In such touchscreen implementations, the keyboard 124 may comprise a virtual keyboard provided on the display 126. Other types of output devices may alternatively be utilized.

The housing 101 may be elongated vertically, or may take on other sizes and shapes (including clamshell housing structures). In the case in which the keyboard 124 includes keys that are associated with at least one alphabetic character and at least one numeric character, the keyboard 124 may include a mode selection key, or other hardware or software, for switching between alphabetic entry and numeric entry.

Figure 2:
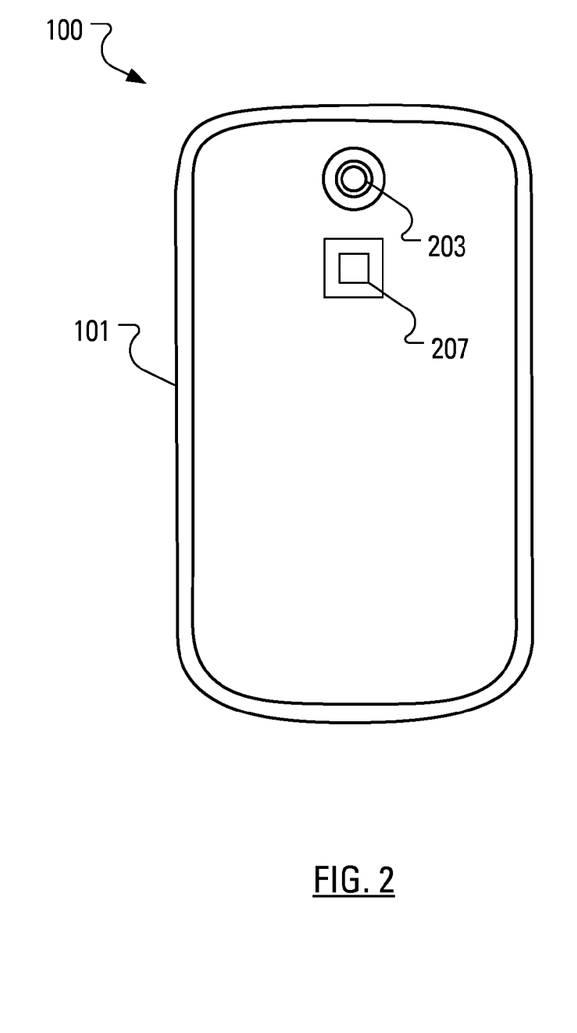
FIG. 2 illustrates a posterior side of the mobile communication device of FIG. 1.

FIG. 2 illustrates a posterior side of the mobile communication device 100. Included on the posterior side are a posterior lens 203 and a Light Emitting Diode (LED) 207 for use as a flash when using the mobile communication device 100 to capture, through the posterior lens 203, a still photograph. The LED 207 may also be used as a torch to provide light when the mobile communication device 100 is used to capture, through the posterior lens 203, video in low ambient light.

Figure 3:
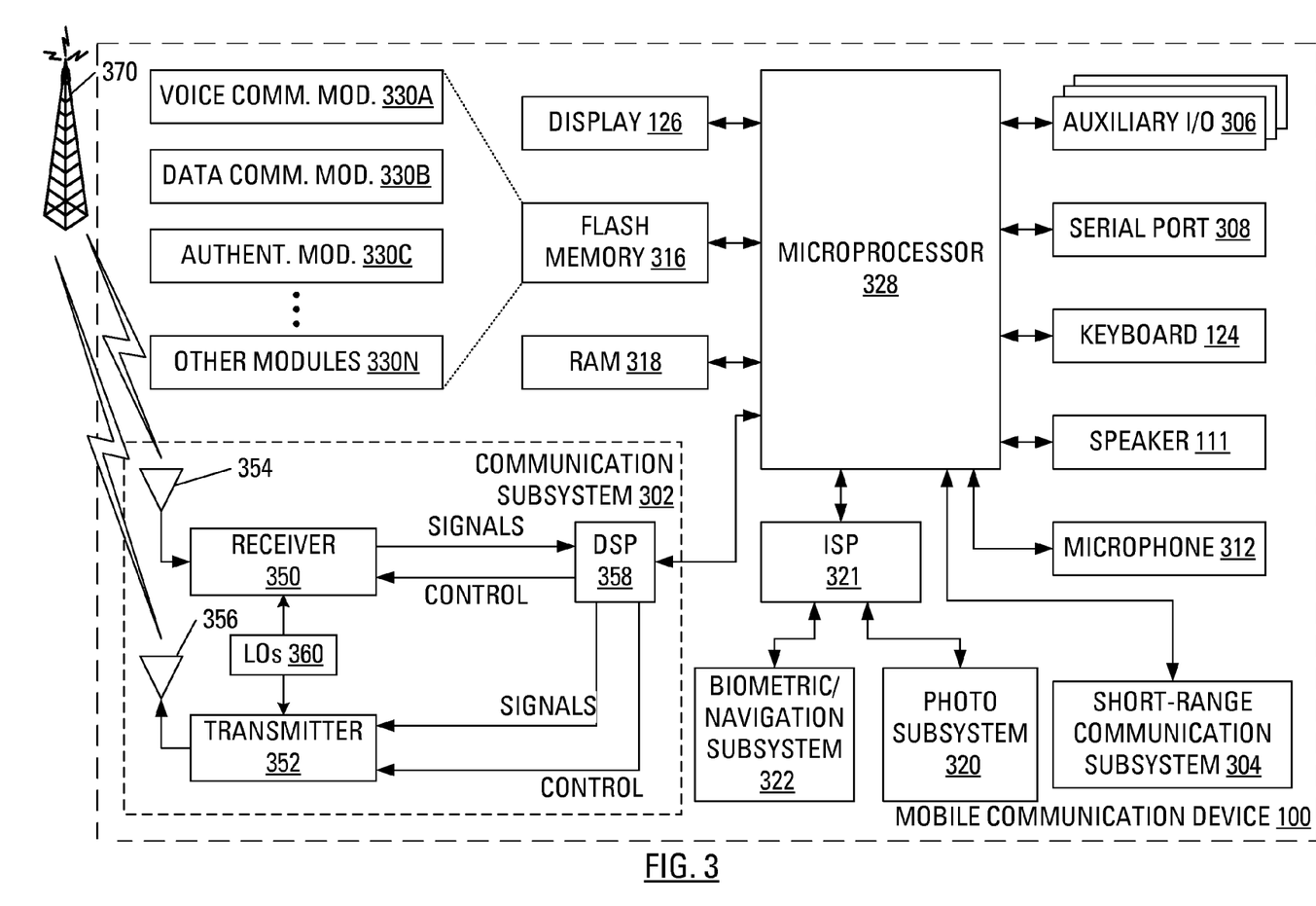
FIG. 3 illustrates an example arrangement of internal components of the mobile communication device of FIG. 1, in accordance with an implementation of the present disclosure.

FIG. 3 illustrates an example arrangement of internal components of the mobile communication device 100. A processing device (a microprocessor 328) is shown schematically in FIG. 3 as coupled between the keyboard 124 and the display 126. The microprocessor 328 controls the operation of the display 126, as well as the overall operation of the mobile communication device 100, in part, responsive to actuation of the keys on the keyboard 124 by a user.

In addition to the microprocessor 328, other parts of the mobile communication device 100 are shown schematically in FIG. 3. These may include a communications subsystem 302, a short-range communications subsystem 304, the keyboard 124 and the display 126. The mobile communication device 100 may further include other input/output devices, such as a set of auxiliary I/O devices 306, a serial port 308, the speaker 111 and a microphone 312. The mobile communication device 100 may further include memory devices including a flash memory 316 and a Random Access Memory (RAM) 318 as well as various other device subsystems. The mobile communication device 100 may comprise a two-way, radio frequency (RF) communication device having voice and data communication capabilities. In addition, the mobile communication device 100 may have the capability to communicate with other computer systems via the Internet.

Operating system software executed by the microprocessor 328 may be stored in a computer readable medium, such as the flash memory 316, but may be stored in other types of memory devices, such as a read only memory (ROM) or similar storage element. In addition, system software, specific device applications, or parts thereof, may be temporarily loaded into a volatile store, such as the RAM 318. Communication signals received by the mobile device may also be stored to the RAM 318.

The microprocessor 328, in addition to its operating system functions, enables execution of software applications on the mobile communication device 100. A predetermined set of software applications that control basic device operations, such as a voice communications module 330A and a data communications module 330B, may be installed on the mobile communication device 100 during manufacture. An authentication module 330C may also be installed on the mobile communication device 100 during manufacture, to implement aspects of the present disclosure. As well, additional software modules, illustrated as an other software module 330N, which may be, for instance, a PIM application, may be installed during manufacture. The PIM application may be capable of organizing and managing data items, such as e-mail messages, calendar events, voice mail messages, appointments and task items. The PIM application may also be capable of sending and receiving data items via a wireless carrier network 370 represented by a radio tower. The data items managed by the PIM application may be seamlessly integrated, synchronized and updated via the wireless carrier network 370 with the device user's corresponding data items stored or associated with a host computer system.

Communication functions, including data and voice communications, are performed through the communication subsystem 302 and, possibly, through the short-range communications subsystem 304. The communication subsystem 302 includes a receiver 350, a transmitter 352 and one or more antennas, illustrated as a receive antenna 354 and a transmit antenna 356. In addition, the communication subsystem 302 also includes a processing module, such as a digital signal processor (DSP) 358, and local oscillators (LOs) 360. The specific design and implementation of the communication subsystem 302 is dependent upon the communication network in which the mobile communication device 100 is intended to operate. For example, the communication subsystem 302 of the mobile communication device 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), Enhanced Data rates for GSM Evolution (EDGE), Universal Mobile Telecommunications System (UMTS), Wideband Code Division Multiple Access (W-CDMA), High Speed Packet Access (HSPA), etc. Other types of data and voice networks, both separate and integrated, may also be utilized with the mobile communication device 100.

Network access requirements vary depending upon the type of communication system. Typically, an identifier is associated with each mobile device that uniquely identifies the mobile device or subscriber to which the mobile device has been assigned. The identifier is unique within a specific network or network technology. For example, in Mobitex™ networks, mobile devices are registered on the network using a Mobitex Access Number (MAN) associated with each device and in DataTAC™ networks, mobile devices are registered on the network using a Logical Link Identifier (LLI) associated with each device. In GPRS networks, however, network access is associated with a subscriber or user of a device. A GPRS device therefore uses a subscriber identity module, commonly referred to as a Subscriber Identity Module (SIM) card, in order to operate on a GPRS network. Despite identifying a subscriber by SIM, mobile devices within GSM/GPRS networks are uniquely identified using an International Mobile Equipment Identity (IMEI) number.

When required network registration or activation procedures have been completed, the mobile communication device 100 may send and receive communication signals over the wireless carrier network 370. Signals received from the wireless carrier network 370 by the receive antenna 354 are routed to the receiver 350, which provides for signal amplification, frequency down conversion, filtering, channel selection, etc., and may also provide analog to digital conversion. Analog-to-digital conversion of the received signal allows the DSP 358 to perform more complex communication functions, such as demodulation and decoding. In a similar manner, signals to be transmitted to the wireless carrier network 370 are processed (e.g., modulated and encoded) by the DSP 358 and are then provided to the transmitter 352 for digital to analog conversion, frequency up conversion, filtering, amplification and transmission to the wireless carrier network 370 (or networks) via the transmit antenna 356.

In addition to processing communication signals, the DSP 358 provides for control of the receiver 350 and the transmitter 352. For example, gains applied to communication signals in the receiver 350 and the transmitter 352 may be adaptively controlled through automatic gain control algorithms implemented in the DSP 358.

In a data communication mode, a received signal, such as a text message or web page download, is processed by the communication subsystem 302 and is input to the microprocessor 328. The received signal is then further processed by the microprocessor 328 for output to the display 126, or alternatively to some auxiliary I/O devices 306. A device user may also compose data items, such as e-mail messages, using the keyboard 124 and/or some other auxiliary I/O device 306, such as the navigation lens 106, a touchpad, a rocker switch, a thumb-wheel, a trackball, a touchscreen, or some other type of input device. The composed data items may then be transmitted over the wireless carrier network 370 via the communication subsystem 302.

In a voice communication mode, overall operation of the device is substantially similar to the data communication mode, except that received signals are output to the speaker 111, and signals for transmission are generated by a microphone 312. Alternative voice or audio I/O subsystems, such as a voice message recording subsystem, may also be implemented on the mobile communication device 100. In addition, the display 126 may also be utilized in voice communication mode, for example, to display the identity of a calling party, the duration of a voice call, or other voice call related information.

The short-range communications subsystem 304 enables communication between the mobile communication device 100 and other proximate systems or devices, which need not necessarily be similar devices. For example, the short-range communications subsystem may include an infrared device and associated circuits and components, or a Bluetooth™ communication module to provide for communication with similarly-enabled systems and devices.

In one implementation, a biometric and optical navigation subsystem 322 and a photography subsystem 320 connect to the microprocessor 328 via an Image Signal Processor (ISP) 321. Indeed, the biometric and optical navigation subsystem 322 and the photography subsystem 320 each include a communication interface (not shown) for managing communication with the ISP 321. Correspondingly, the ISP 321 includes a first communication interface (not shown) for managing communication with the biometric and optical navigation subsystem 322, a second communication interface (not shown) for managing communication with the photography subsystem 320 and a third communication interface (not shown) for managing communication with microprocessor 328. In an alternative implementation (not shown), the biometric and optical navigation subsystem 322 connects to the microprocessor 328 over a communication channel that bypasses the ISP 321.

Figure 4:
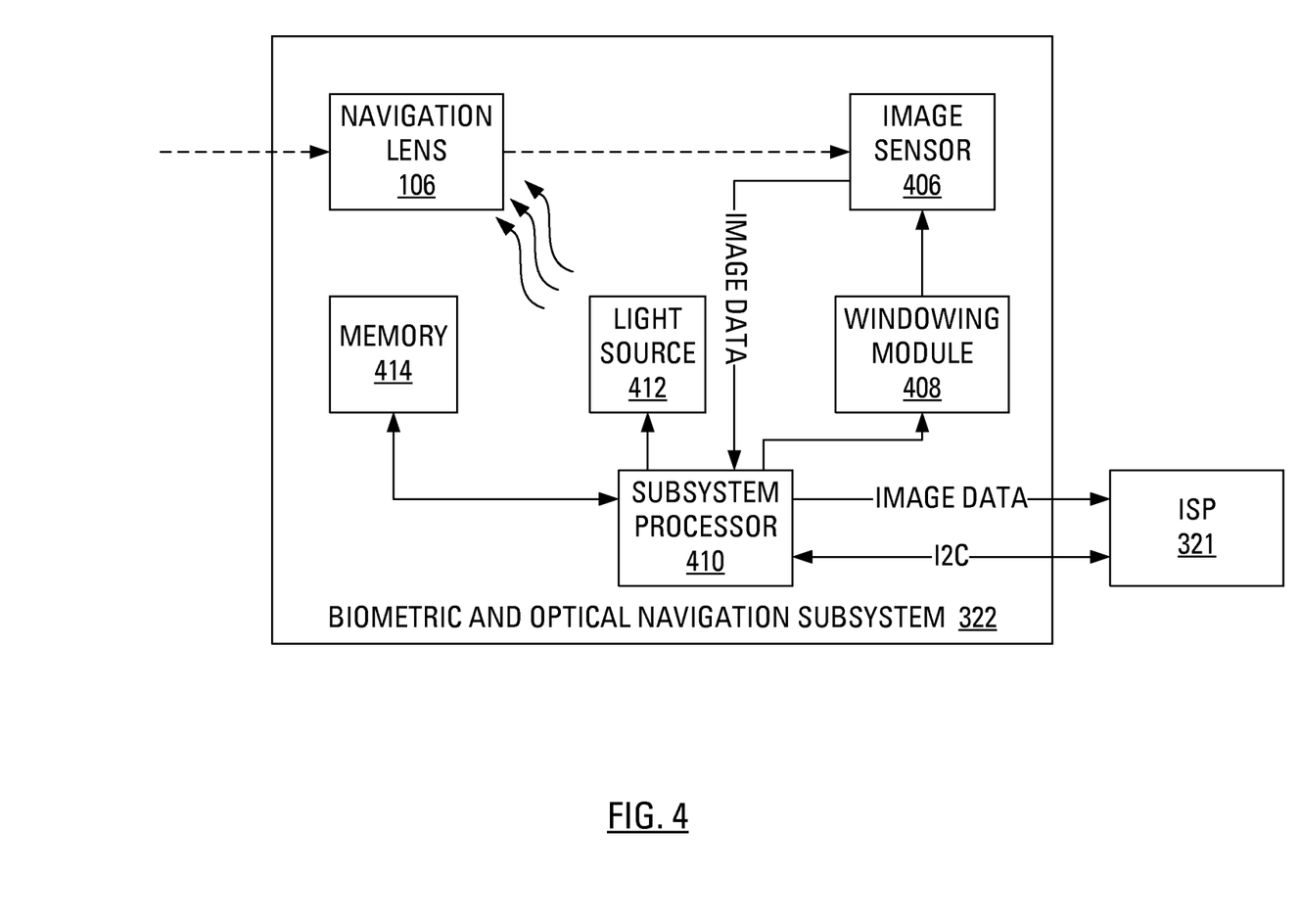
FIG. 4 illustrates an example biometric and optical navigation subsystem for the mobile communication device of FIG. 1, in accordance with an implementation of the present disclosure.

An example arrangement of components of the biometric and optical navigation subsystem 322 is schematically illustrated in FIG. 4 as including the navigation lens 106, a windowing module 408, an image sensor 406, a light source 412, a memory 414 and a biometric and optical navigation subsystem processor 410. The biometric and optical navigation subsystem processor 410 exerts control, via the windowing module 408, over the window size recorded at the image sensor 406. The light source 412 is also under control of the biometric and optical navigation subsystem processor 410. A control connection between the biometric and optical navigation subsystem processor 410 and the ISP 321 may be accomplished using an Inter-Integrated Circuit ($I^2C$) bus. An $I^2C$ bus is a multi-master, serial, single-ended computer bus that is used to attach low-speed peripherals to a motherboard, an embedded system or a cellular telephone.

A set of operating instructions may be installed in the memory 414 during manufacture, to allow the biometric and optical navigation subsystem processor 410 to implement aspects of the present disclosure.

The photography subsystem 320, which may be configured for capturing digital photographs and/or video of subjects that are greater than 10 cm away from the posterior lens 203, may include the posterior lens 203 with corresponding posterior shutter (not shown), the LED 207, an image sensor (not shown) and a posterior photography subsystem processor (not shown). A control connection between the photography subsystem 320 and the ISP 321 may be accomplished using an $I^2C$ bus.

Figure 5:
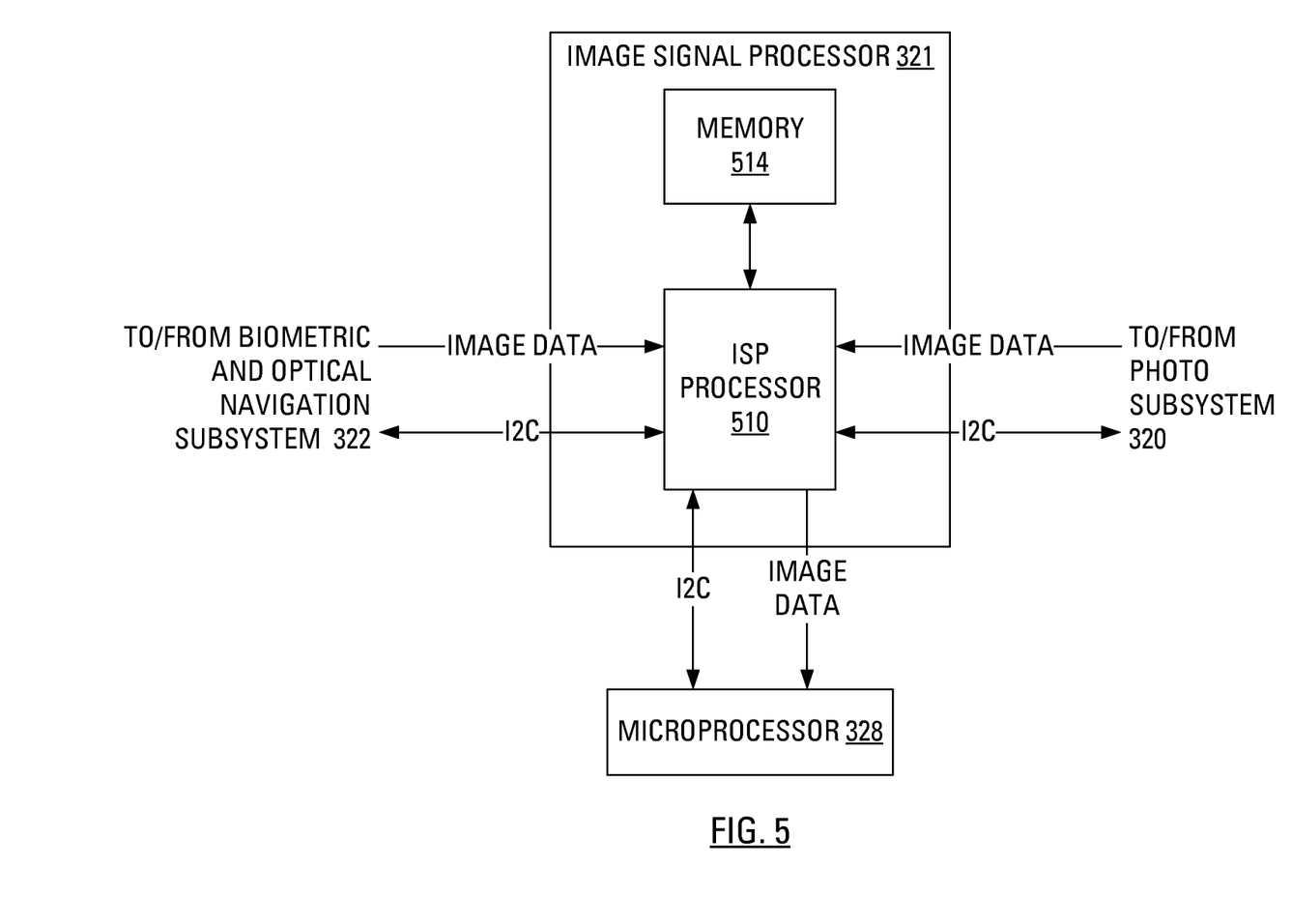
FIG. 5 illustrates an example image signal processor for the mobile communication device of FIG. 1, in accordance with an implementation of the present disclosure.

FIG. 5 illustrates an example of the components of the ISP 321 for the mobile communication device 100 of FIG. 1. In particular, the ISP 321 may include an ISP processor 510 and an ISP memory 514. The ISP memory 514 may be used to buffer received data and may also store computer readable instructions for use by the ISP processor 510. Notably, the ISP memory 514 is likely to be small and embedded within the ISP processor 510. The ISP memory 514 is shown separately merely for purposes of illustration and should not preclude the option that the ISP memory 514 is implemented in the ISP processor 510. In a manner similar to the manner in which the ISP 321 connects to the biometric and optical navigation subsystem processor 410, the ISP 321 may connect to the microprocessor 328 using an $I^2C$ bus.

In overview, the biometric and optical navigation subsystem 322 may be used when obtaining a candidate fingerprint for the mobile communication device 100 (e.g., for authentication purposes). To accommodate such use of the biometric and optical navigation subsystem 322, the biometric and optical navigation subsystem 322 may be adapted, according to the present disclosure, to automatically adjust a processed image sensor window from a first set of window dimensions (e.g., 16 pixels by 16 pixels for optical navigation) to a second set of window dimensions (e.g., 512 pixels by 64 pixels for fingerprint capture). Alternatively, a single, static set of window dimension may be employed in conjunction with stitching algorithms, or other methods suitable for forming candidate fingerprint images by combining a plurality of images obtained using the static set of window dimension.

The mobile communication device 100 may be arranged to have various security modes including, for example, a locked mode and an unlocked mode.

In locked mode, a user has limited access to the functions of the mobile communication device 100. The mobile communication device 100 may be capable of receiving incoming telephone calls or may be capable of placing an emergency telephone call while in locked mode. Additionally, the mobile communication device 100 may be capable of receiving messages (e.g., e-mail messages, Short Messaging Service messages, instant messenger messages, etc.), but the messages may not be viewed by the user while the device is in locked mode. The mobile communication device 100 can do little else but provide a dialog indicating that the mobile communication device 100 is in locked mode and indicating the action that is to be taken by the user to change the mode of the mobile communication device 100 to unlocked mode. Upon changing the mode of the mobile communication device 100 to unlocked mode, the user may be provided much greater access to the functionality of the mobile communication device 100.

When the mobile communication device 100 is in locked mode, there may exist a requirement that a user provide, to the mobile communication device 100, one or more forms of authentication input before the mobile communication device 100 will change over to unlocked mode. Such authentication input may take the form of input provided on the keyboard 124, where the input may be a password formed of alphanumeric characters and/or symbols. Alternatively or additionally, such authentication input may take the form of biometric input. Biometric input may include one or more fingerprints, retinal scans, face geometry scans, hand geometry scans, voice prints or speech prints, etc.

In recognition of the security provided by biometric authentication, manufacturers of mobile communication devices such as notebook computers, cellular telephones and so-called smart phones, which combine elements of notebook computers and cellular telephones, have been known to include a built-in fingerprint sensor in their products.

One example fingerprint sensor has a bar shape. A silicon sensor constructs a fingerprint as a user swipes a finger across the bar. Another example fingerprint sensor has a pad shape. A sensor constructs a fingerprint as a user holds a finger on the pad, which is designed with a size to accommodate an entire fingerprint.

It is proposed herein to employ the biometric and optical navigation subsystem 322 in place of a dedicated fingerprint sensor. In an adjustable window mode implementation, employment of the biometric and optical navigation subsystem 322 uses a control system that can adjust a processed image sensor window from a first set of window dimensions (e.g., 16×16 pixels for optical navigation) to a second set of window dimensions (e.g., 512×64 pixels for fingerprint capture). In a small-window stitching implementation, a single, static set of window dimension may be employed in conjunction with stitching algorithms, or other methods suitable for forming candidate fingerprint images by combining a plurality of images obtained using the static set of window dimension.

Figure 6:
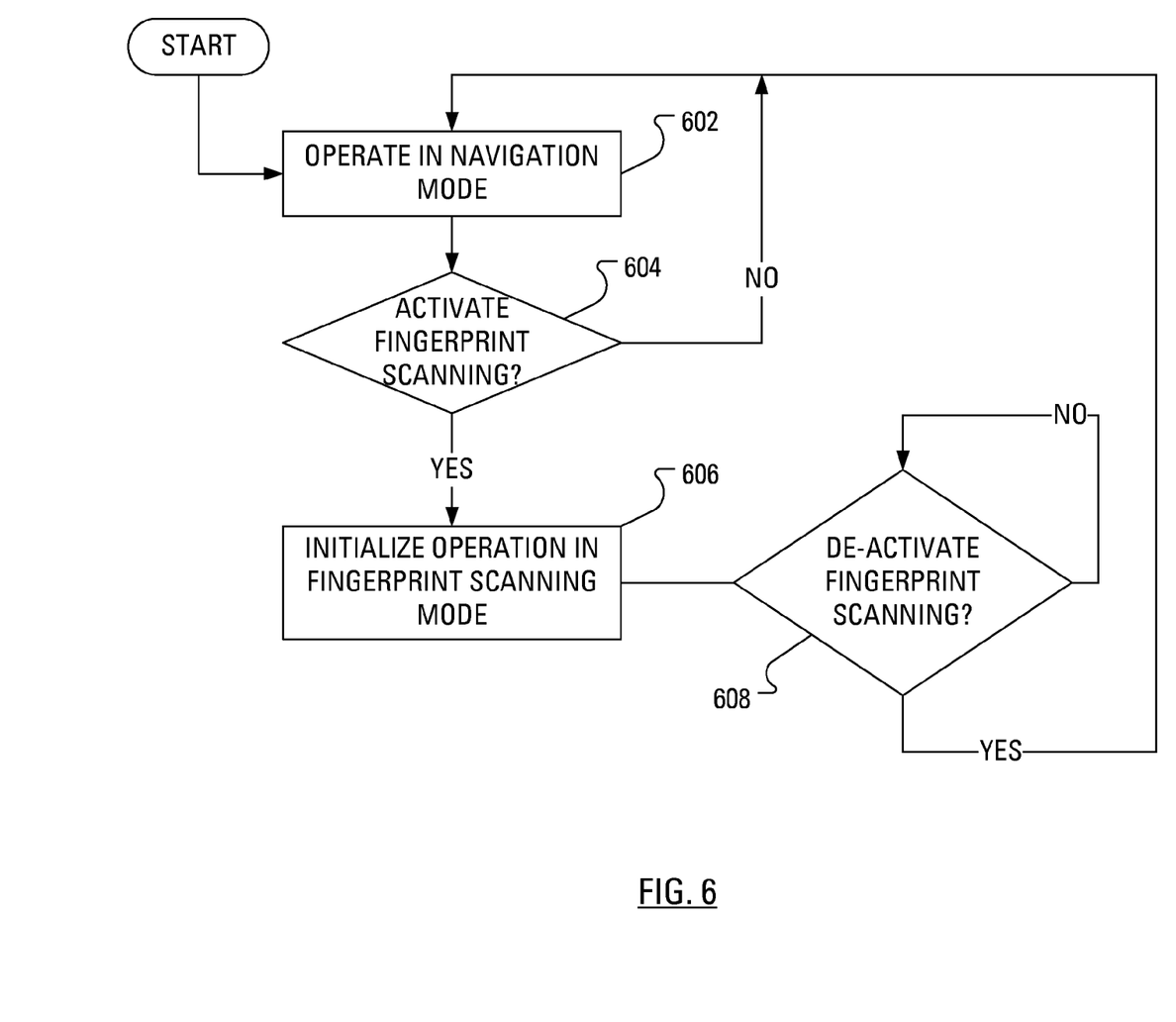
FIG. 6 illustrates example steps in a method of switching between a navigation mode of operation and a fingerprint scanning mode of operation for the example biometric and optical navigation subsystem of FIG. 4, in accordance with an implementation of the present disclosure.

In operation of the adjustable window mode implementation, in view of FIG. 6, the biometric and optical navigation subsystem 322 may be arranged to normally operate (step 602) in navigation mode with the first set of window dimensions (e.g., 16×16 pixels). Periodically, the biometric and optical navigation subsystem processor 410 may determine (step 604) whether fingerprint scanning mode is to be activated.

The image sensor 406 may, for example, have a resolution 500 dots per inch (dpi). It follows then that for a scanning area of approximately one square inch, the image sensor 406 may have dimensions defined as 512×384 pixels. The dimensions may be reduced through use of appropriate optics.

The windowing module 408 allows for "windowing", which is also called "selective area processing". Accordingly, the windowing module 408 allows the ISP 321 to specify a window size and a window placement on the image sensor 406 at which images are captured. More particularly, the ISP 321 transmits a windowing instruction to the biometric and optical navigation subsystem processor 410, the windowing instruction specifying, for example, a window size and a window placement. Upon receipt of the instruction, the biometric and optical navigation subsystem processor 410 may instruct the windowing module 408 accordingly. The windowing module 408 may then operate the image sensor 406 to capture images inside a window with the properties specified by the windowing instructions.

The windowing instruction may also specify a frame rate. The image sensor 406 may, for example, support a frame rate of 3000 frames/sec at a resolution of 16×16, which is well suited to navigation mode. These parameters can be changed while maintaining a specific performance. Performance of the image sensor 406 may be measured in counts per inch (cpi). An example specific performance is 1200 cpi.

The image sensor 406 may, for another example, support a frame rate of 60 frames/sec at a resolution of 512×64 pixels, which is well suited to fingerprint scanning mode.

Figure 7A:
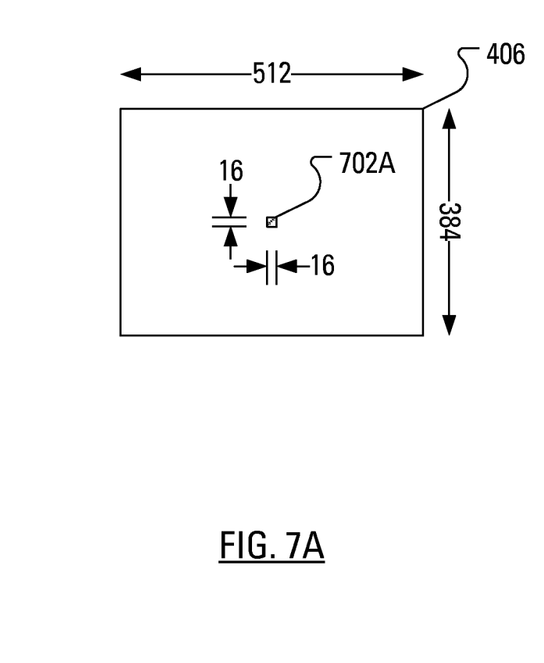
FIG. 7A illustrates an example navigation mode window, in accordance with an implementation of the present disclosure.

In the navigation mode, the windowing module 408 may, for example, instruct the image sensor 406 to record images with a navigation mode window 702A that is 16 pixels wide and 16 pixels high, as illustrated in FIG. 7A.

In the navigation mode, the image sensor 406 may transfer images captured through the navigation mode window 702A to the biometric and optical navigation subsystem processor 410 for processing and storage. The biometric and optical navigation subsystem processor 410 may process the images and transmit an indication, to the ISP 321 for passing to the microprocessor 328, of a movement of the user's finger. The processing aims to resolve details on the surface of a finger to determine which direction a user's finger is moving as the user's finger travels over the navigation lens 106. Such processing typically comprises processing the received image in the context of a plurality of previously received images to determine a change (also known as a "delta", represented as "Δ") in one linear direction (say, an "x" direction) and in another linear direction (say, a "y" direction), which is often perpendicular to the x direction. Accordingly, the indication that the biometric and optical navigation subsystem processor 410 transmits to the ISP processor 510 may include a value for each of Δx and Δy as well as a rate of change of position. That is, the indication may include representation of a direction of motion of the finger along with a representation of the speed of the motion of the finger. The ISP processor 510 may, in turn, pass the indication to the microprocessor 328.

Figure 7B:
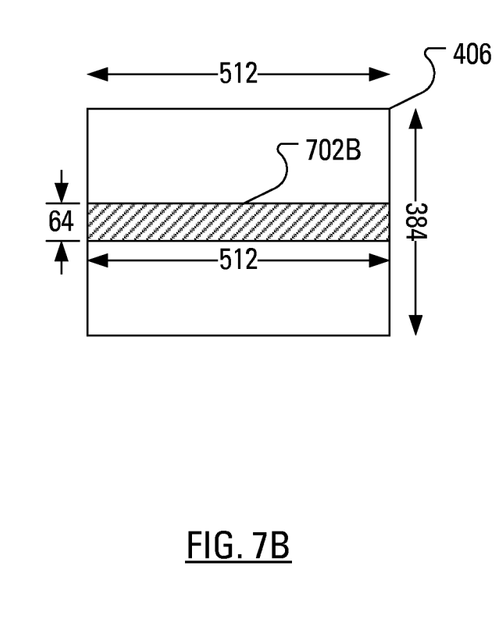
FIG. 7B illustrates an example fingerprint scanning mode window, in accordance with an implementation of the present disclosure.

In the fingerprint scanning mode, the windowing module 408 may, for example, instruct the image sensor 406 to record images with a fingerprint scanning mode window 702B having a width of 512 pixels and a height of 64 pixels, as illustrated in FIG. 7B.

In the fingerprint scanning mode, the image sensor 406 may transfer images captured through the fingerprint scanning mode window 702B to the biometric and optical navigation subsystem processor 410. The biometric and optical navigation subsystem processor 410, in turn, transfers the images to the ISP 321 for processing and storage. The ISP processor 510 may process the images and provide, to the microprocessor 328, a candidate digital fingerprint, as will be described hereinafter.

In view of FIG. 6, if the biometric and optical navigation subsystem processor 410 determines (step 604) that fingerprint scanning mode is not to be activated, operation (step 602) in navigation mode continues. However, the biometric and optical navigation subsystem processor 410 may determine (step 604) that fingerprint scanning mode is to be activated, for example, due to receipt of an instruction from the ISP processor 510 to activate fingerprint scanning mode.

The instruction from the ISP processor 510 may be transmitted responsive to receipt, by the ISP processor 510, of an instruction from the microprocessor 328. In one implementation, the microprocessor 328 determines that there is a cause for the biometric and optical navigation subsystem 322 to operate in fingerprint scanning mode and indicates the fingerprint scanning mode in the instruction to the ISP 321.

Accordingly, in one implementation, determining (step 604) whether fingerprint scanning mode is to be activated comprises reviewing an instruction received from the ISP processor 510 for an indication that fingerprint scanning mode is to be activated.

Upon determining (step 604) that fingerprint scanning mode is to be activated, the biometric and optical navigation subsystem processor 410 may initialize (step 606) operation of the windowing module 408 in a fingerprint scanning mode.

The biometric and optical navigation subsystem 322 may continue to operate in the fingerprint scanning mode until the biometric and optical navigation subsystem processor 410 determines (step 608) that fingerprint scanning mode is to be de-activated.

Upon determining (step 608) that fingerprint scanning mode is to be de-activated, the biometric and optical navigation subsystem processor 410 may return to operation (step 602) in navigation mode.

Figure 8:
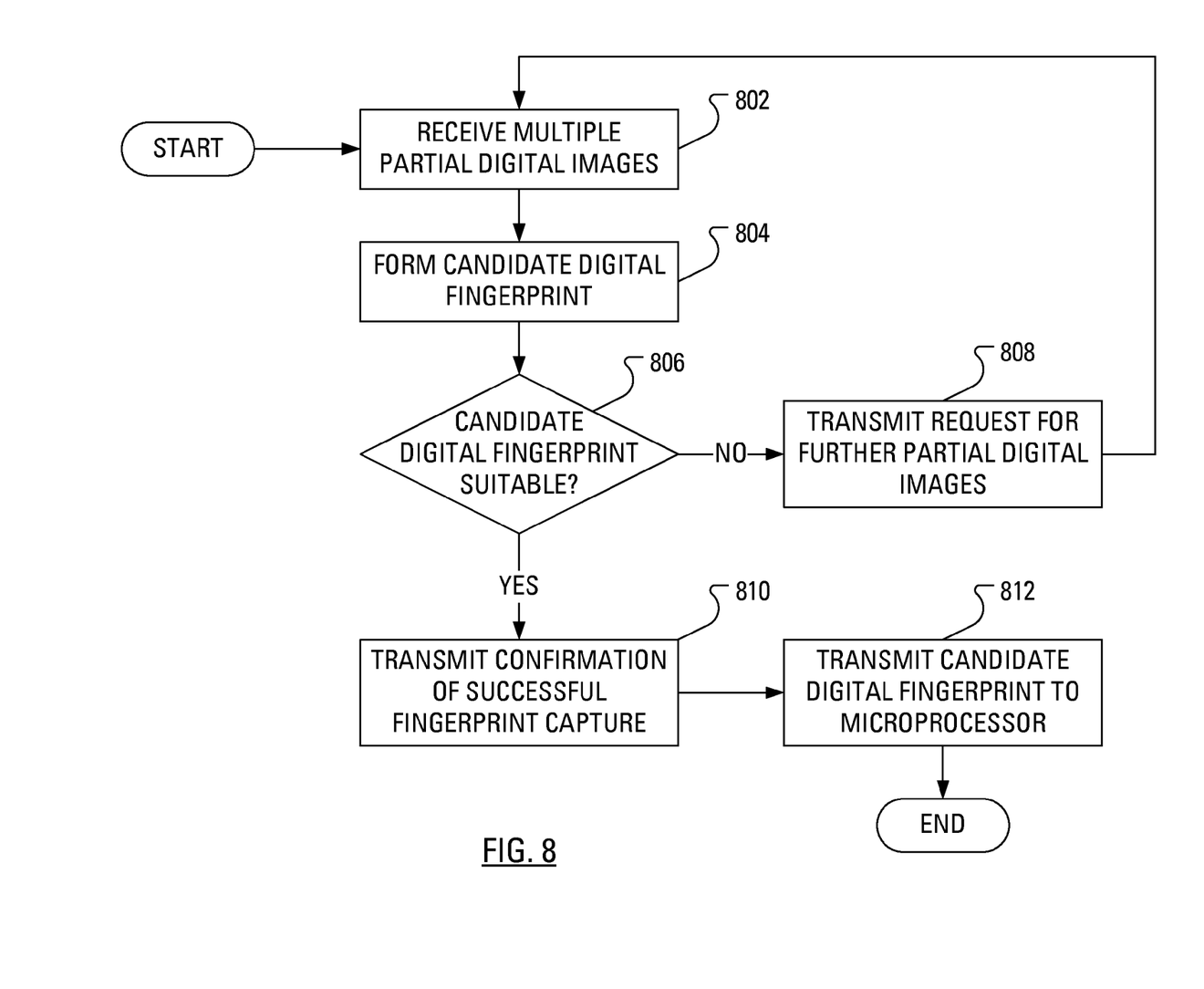
FIG. 8 illustrates example steps in a method of operation for the image signal processor of FIG. 5, in accordance with an implementation of the present disclosure.

As illustrated in FIG. 3, the biometric and optical navigation subsystem 322 and the photography subsystem 320 connect to the same ISP 321. FIG. 8 illustrates example steps in a method of operation for the ISP processor 510.

It is proposed herein to configure the ISP processor 510 with image stitching algorithms such that the ISP processor 510 may, upon receipt (step 802) of the multiple partial digital images of the finger from the biometric and optical navigation subsystem 322, combine the multiple partial digital images to form (step 804) a candidate digital fingerprint. The ISP processor 510 may then determine (step 806) whether the formed candidate digital fingerprint is suitable for use by the authentication module 330C.

A typical fingerprint identification algorithm seeks to detect, in a candidate digital fingerprint, a number of "features" suitable to enable an adequate level of discrimination relative to other fingerprints not from the enrolled user. A candidate digital fingerprint may be determined (step 806) to be suitable for use by the authentication module 330C based on the detection, in the candidate digital fingerprint, of a number of features exceeding a predetermined threshold number of features. The predetermined threshold number of features is dependent on a level of discrimination desired (say, 1 in 1 000, 1 in 10 000, 1 in 1 000 000, etc.).

Upon determining (step 806) that the candidate digital fingerprint is not yet suitable for use by the authentication module 330C, the ISP processor 510 may transmit (step 808) a request to the biometric and optical navigation subsystem 322 for further partial digital images. Upon determining (step 806) that the candidate digital fingerprint is suitable for use by the authentication module 330C, the ISP processor 510 may transmit (step 810), to the biometric and optical navigation subsystem 322, a confirmation that the fingerprint has been successfully captured. The ISP processor 510 may then transmit (step 812) the candidate digital fingerprint to the microprocessor 328.

Upon receiving the candidate digital fingerprint, the microprocessor 328 may implement the authentication module 330C to perform a conventional comparison of the received candidate digital fingerprint to a previously stored template digital fingerprint. The result of the comparison may be represented by a value representative of a degree of match between the candidate and the template. Based on the degree of match, the microprocessor 328 may unlock the mobile communication device 100 for use by the user.

As will be clear to a person of ordinary skill in the art, an authentication dialog presented on the display 126 under control of the microprocessor 328 may indicate a requirement for a combination of password and one or more fingerprints to successfully unlock the mobile communication device 100. The use of a single fingerprint has been described above for simplicity of presentation.

In an alternative implementation, in fingerprint scanning mode, the actions of the image sensor 406 when obtaining a candidate digital fingerprint may be described as obtaining a high-resolution raster scan as a user's finger passes over the navigation lens 106. When the raster scan is described by "high-resolution" the term is used relative to the resolution used when the biometric and optical navigation subsystem 322 is operating in navigation mode. The term resolution is used to refer to the amount of information collected by the image sensor 406.

In an alternative implementation, the navigation mode may be termed a low-resolution full frame mode.

In a small-window stitching implementation, a single, static set of window dimension (for example, 20 pixels×20 pixels) may be employed in conjunction with stitching algorithms suitable for forming a candidate fingerprint image, with dimension 200 pixels×200 pixels, for example, by combining a plurality of 20×20 images.

In operation of the small-window stitching implementation, a finger is moved over the surface of the navigation lens 106. The biometric and optical navigation subsystem processor 410 may control the windowing module 408 to maintain a specifically sized window at the image sensor 406. The image sensor 406 captures a plurality of images and transfers the images to the biometric and optical navigation subsystem processor 410. A feature of the operation of the small-window stitching implementation is a lack of distinction between a fingerprint scanning mode and a navigation mode.

Figure 9:
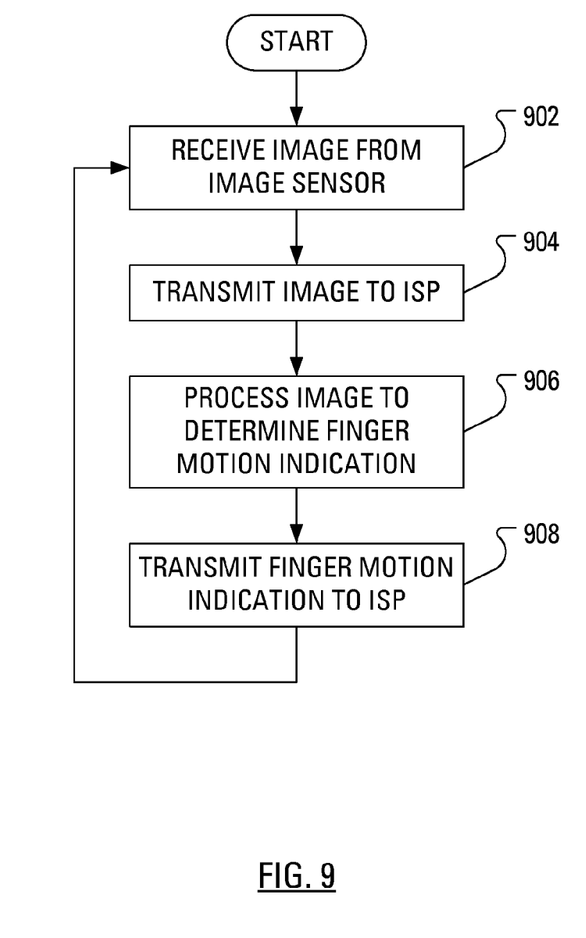
FIG. 9 illustrates example steps in a method of processing images received at the biometric and optical navigation subsystem processor of FIG. 4, in accordance with an implementation of the present disclosure.

FIG. 9 presents example steps in a method of processing images received at the biometric and optical navigation subsystem processor 410 from the image sensor 406. The biometric and optical navigation subsystem processor 410 receives (step 902) an image and transmits (step 902) the image to the ISP 321. The biometric and optical navigation subsystem processor 410 also processes (step 906) the image to determine representations of finger motion and transmits (step 908) a finger motion indication to the ISP 321. The finger motion indication may include representation of the direction of motion of the finger along with a representation of the speed of the motion of the finger.

The ISP 321 may then carry out the method of image processing presented above in view of FIG. 8. Upon receipt (step 802) of the multiple partial digital images of the finger from the biometric and optical navigation subsystem 322, the ISP processor 510 may combine the multiple digital images to form (step 804) a candidate digital fingerprint. The ISP processor 510 may then determine (step 806) whether the formed candidate digital fingerprint is suitable for use by the authentication module 330C.

Upon determining (step 806) that the candidate digital fingerprint is not yet suitable for use by the authentication module 330C, the ISP processor 510 may transmit (step 808) a request to the biometric and optical navigation subsystem 322 for further partial digital images. Upon determining (step 806) that the candidate digital fingerprint is suitable for use by the authentication module 330C, the ISP processor 510 may transmit (step 810), to the biometric and optical navigation subsystem 322, a confirmation that the fingerprint has been successfully captured. The ISP processor 510 may then transmit (step 812) the candidate digital fingerprint to the microprocessor 328.

Successive images are stitched together until the ISP processor 510 determines (step 806) that the candidate digital fingerprint is suitable. Accordingly, even though an actual frame rate of capture of small-window images may remain constant, an "effective" frame rate of acceptable larger-window images is expected to be variable. Such an "effective" frame rate may be determined based on several independent parameters, one such parameter being the exact path of finger motion.

Upon receiving the candidate digital fingerprint, the microprocessor 328 may implement the authentication module 330C to perform a conventional comparison of the received candidate digital fingerprint to a previously stored template digital fingerprint. The result of the comparison may be represented by a value representative of a degree of match between the candidate and the template. Based on the degree of match, the microprocessor 328 may unlock the mobile communication device 100 for use by the user.

In a further alternative implementation, rather than transfer (step 812) the candidate digital fingerprint to the microprocessor 328, the ISP processor 510 may perform (not shown) a matching function. Provided that the ISP processor 510 has access to an appropriate fingerprint template, the ISP processor 510 may attempt to determine whether the candidate digital fingerprint stitched together from multiple partial images is a match for the fingerprint template. That is, the ISP processor 510 may perform a conventional comparison of the received candidate digital fingerprint to a previously stored template digital fingerprint. The result of the comparison may be represented by a value representative of a degree of match between the candidate and the template. The ISP processor 510 may then transmit an indication of the degree of match to the microprocessor 328. Based on the degree of match received from the ISP 321, the microprocessor 328 may unlock the mobile communication device 100 for use by the user.

In conjunction with handling images received from the biometric and optical navigation subsystem processor 410, the ISP 321 may also handle the deltas received from the biometric and optical navigation subsystem processor 410. In one case, the ISP 321 may simply pass the deltas to the microprocessor 328. Further alternatively, the biometric and optical navigation subsystem processor 410 may, as discussed above, maintain a direct connection to the microprocessor 328. In such a case, the biometric and optical navigation subsystem processor 410 may transfer the deltas directly to the microprocessor 328, bypassing the ISP 321.

In use, when the mobile communication device 100 is in locked mode, the fingerprint scanning function may be recognized as more helpful than the navigation function, even when both functions are available simultaneously, as may be the case in the small-window stitching implementation. Upon capturing a suitable candidate digital fingerprint and successfully authenticating a user, i.e., when the mobile communication device 100 is in unlocked mode, the navigation function may be recognized as more helpful than the fingerprint scanning function.

In an implementation made possible by the methods and hardware discussed above, a user may be allowed to gain access to operation of the mobile communication device merely by providing a correctly authenticated password. Thereafter, i.e., once the mobile communication device 100 has completed a transition into unlocked mode and the user's primary use of the biometric and optical navigation subsystem 322 is for the navigation function, the biometric and optical navigation subsystem 322 may continue to transmit images to the ISP 321. At the ISP 321, and unbeknownst to the user, the images may be processed to obtain a candidate digital fingerprint that can be used to authenticate the user.

Upon successful authentication, the user's interaction with the mobile communication device 100 may be allowed to continue unabated. However, upon authentication failure, the mobile communication device 100 may be returned to locked mode.

The above-described implementations of the present application are intended to be examples only. Alterations, modifications and variations may be effected to the particular implementations by those skilled in the art without departing from the scope of the application, which is defined by the claims appended hereto.

What is claimed is:

1. A method of handling images in a wireless device having an image processor coupled to an image sensor, the method comprising:
   transmitting windowing instructions to the image sensor, the windowing instructions specifying at least one of: (a) a size for a window on the image sensor, inside which window images are to be captured, and (b) a placement of a window on the image sensor, inside which window images are to be captured;
   receiving, from the image sensor, a digital image of a finger captured at the image sensor inside the window defined by the windowing instructions; and
   processing the digital image in a context of a plurality of previously received digital images to determine a finger motion indication.

2. The method of claim 1 wherein the finger motion indication comprises an indication of a position change in a first linear direction.

3. The method of claim 2 wherein the finger motion indication comprises an indication of a position change in a second linear direction.

4. The method of claim 1 wherein the finger motion indication comprises an indication of a rate of position change.

5. A biometric and optical navigation subsystem comprising:
   an image sensor;
   a processor adapted to:
     transmit windowing instructions to the image sensor, the windowing instructions specifying at least one of: (a) a size for a window on the image sensor, inside which window images are to be captured, and (b) a placement of a window on the image sensor, inside which window images are to be captured;
     receive, from the image sensor, a digital image of a finger captured at the image sensor; and
     process the digital image in a context of a plurality of previously received digital images to determine a finger motion indication.

6. The biometric and optical navigation subsystem of claim 5 further comprising:
   a windowing module interposing the processor and the image sensor, the windowing module adapted to:
     receive instructions from the processor and, based on the instructions, control the image sensor.

7. The biometric and optical navigation subsystem of claim 5 further comprising a communication interface for managing communication with an image processor.

8. The biometric and optical navigation subsystem of claim 5 wherein the communication interface comprises an Inter-Integrated Circuit bus interface.

9. The biometric and optical navigation subsystem of claim 5 wherein the windowing instructions specify a frame rate for the image sensor on which images are to be captured.

10. A non-transitory computer readable medium containing computer-executable instructions that, when performed by a processor for a photography subsystem, cause the processor to:
    transmit windowing instructions to an image sensor, the windowing instructions specifying at least one of: (a) a size for a window on the image sensor, inside which window images are to be captured, and (b) a placement of a window on the image sensor, inside which window images are to be captured;
    receive, from the image sensor, a digital image of a finger captured by an image sensor; and
    process the digital image in a context of a plurality of previously received digital images to determine a finger motion indication.

11. The non-transitory computer readable medium of claim 10 wherein the finger motion indication comprises an indication of a position change in a first linear direction.

12. The non-transitory computer readable medium of claim 11 wherein the finger motion indication comprises an indication of a position change in a second linear direction.

13. The non-transitory computer readable medium of claim 10 wherein the finger motion indication comprises an indication of a rate of position change.

14. The non-transitory computer readable medium of claim 10 wherein the instructions further cause the processor to receive windowing instructions from an image processor and transmit the windowing instructions to a suitable module.

* * * * *